United States Patent [19]

Härtel

[11] Patent Number: 4,765,600
[45] Date of Patent: Aug. 23, 1988

[54] PNEUMATIC SPRING ELEMENT

[75] Inventor: Volker Härtel, Germering, Fed. Rep. of Germany

[73] Assignee: Metzeler Kautschuk GmbH, München, Fed. Rep. of Germany

[21] Appl. No.: 930,301

[22] Filed: Nov. 13, 1986

[30] Foreign Application Priority Data

Nov. 13, 1985 [DE] Fed. Rep. of Germany ....... 3540300

[51] Int. Cl.$^4$ ................................................ F16F 9/08
[52] U.S. Cl. .................................. 267/122; 188/267; 248/550; 248/562; 248/636; 267/35; 267/140.1; 267/141.1; 267/152; 267/219; 280/707; 280/710; 280/712
[58] Field of Search ................ 188/267; 180/300, 902; 248/550, 562, 632, 634, 636; 280/697, 707, 708, 710, 712; 267/35, 219, 218, 140.1, 141.1, 122, 152, 64.23

[56] References Cited

U.S. PATENT DOCUMENTS

| | | | |
|---|---|---|---|
| 2,818,249 | 12/1957 | Boschi | 267/35 X |
| 2,859,032 | 11/1958 | Johnson | 267/118 |
| 4,351,515 | 9/1982 | Yoshida | 248/562 X |
| 4,401,298 | 8/1983 | Eaton et al. | 267/35 X |
| 4,416,445 | 11/1983 | Coad | 267/35 |
| 4,444,298 | 4/1984 | Stangroom | 192/58 B X |

FOREIGN PATENT DOCUMENTS

| | | | |
|---|---|---|---|
| 129944 | 8/1982 | Japan | 248/566 |
| 524287 | 8/1940 | United Kingdom | 267/35 |

Primary Examiner—George E. A. Halvosa
Attorney, Agent, or Firm—Herbert L. Lerner; Laurence A. Greenberg

[57] ABSTRACT

A pneumatic spring element includes a rubber-elastic peripheral wall and two rigid end walls defining a chamber therebetween, a bellows-like spring body disposed inside the chamber defining an outer sub-chamber between spring body and the peripheral wall, the spring body being subjected to compressed air in the interior thereof, and an electroviscous fluid filling outer sub-chamber and being controlled by an electrical field.

6 Claims, 1 Drawing Sheet

U.S. Patent
Aug. 23, 1988
4,765,600
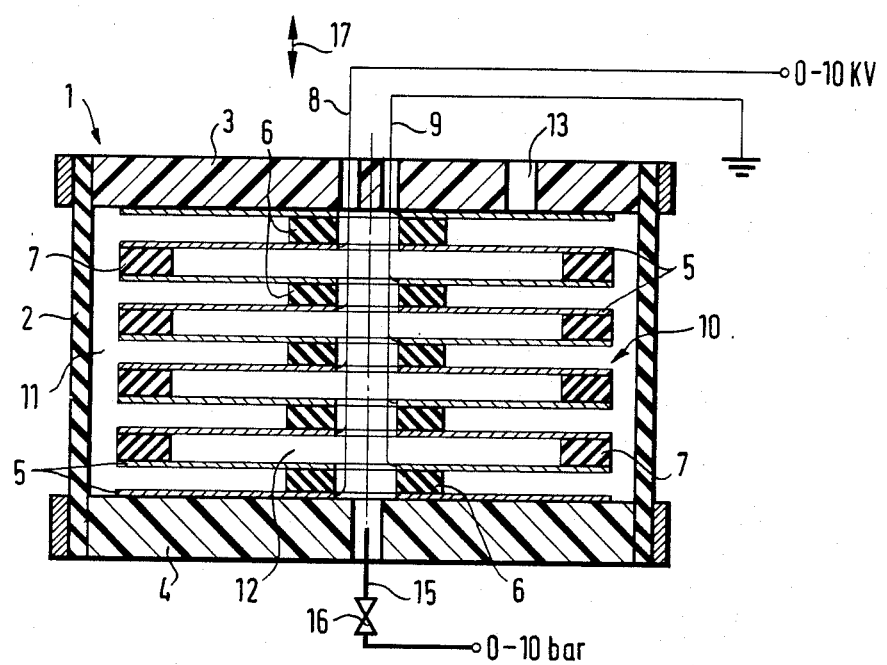

PNEUMATIC SPRING ELEMENT

The invention relates to a pneumatic spring element having an accordion or bellows-like spring body subjected to compressed air at the interior thereof.

Pneumatic spring elements of this kind are typically connected to a source of compressed air for establishing the air pressure in the elastic, bellows-like spring body and for keeping this pressure constant, and such spring elements have a spring rate that is independent of the deflection and always have the same restoring force and therefore the same stiffness. However, the disadvantage of these pneumatic spring elements is that they exhibit almost no damping when deflected; that is, vibration-like stresses introduced into them are not damped. In order to attain such damping, separate dampers must typically be connected in parallel with the spring elements.

It is accordingly an object of the invention to provide a pneumatic spring element which overcomes the hereinafore-mentioned disadvantages of the heretofore-known devices of this general type, which has a stiffness that can be adjusted in the conventional manner by mean of air pressure and in which damping is also provided; the damping also being variably adjustable and in fact largely independently of the stiffness and over a wide frequency range.

With the foregoing and other objects in view there is provided, in accordance with the invention, a pneumatic spring element, comprising a rubber-elastic peripheral wall and two rigid end walls defining a chamber therebetween, a bellows or accordion-like spring body disposed inside the chamber defining an outer sub-chamber between the spring body and the peripheral wall, the spring body being subjected to compressed air in the interior thereof, and an electroviscous fluid filling the outer sub-chamber and being controllable or triggerable by an electrical field.

In accordance with another feature of the invention, the bellows-like spring body is formed of a stack of at least three annular disk-shaped metal plates having inner and outer peripheries, and including annular rubber elements alternately joining the metal plates together at the inner and outer peripheries thereof, and means for alternately connecting the metal plates to a voltage source and to ground potential.

Upon deflection of the spring body, the spacing between the metal plates decreases, causing the fluid located in the interstices between each two plates that are open on the outer periphery to be positively displaced toward the outside. By applying a voltage to these metal plates which act as electrodes, the viscosity of the electroviscous fluid can also be varied, as a result of which the flow resistance and therefore the damping of the spring element vary as well.

In accordance with a further feature of the invention, the metal plates are spaced apart in an unstressed state by between 1 and 5 mm.

In accordance with an added feature of the invention, the annular rubber elements mutually insulate as well as interconnect the metal plates and are formed of electrically insulating elastomer material.

In accordance with an additional feature of the invention, the spring body has an air-filled inner sub-chamber formed therein, and the connecting means include electrical connections for the metal plates extending inside the air-filled inner sub-chamber.

In accordance with yet another feature of the invention, the electrical connections are formed of electrically conductive natural rubber.

In accordance with a concomitant feature of the invention, the spring body has an inner sub-chamber formed therein, and one of the end plates has a compressed air valve disposed therein communicating with the inner sub-chamber.

Other features which are considered as characteristic for the invention are set forth in the appended claims.

Although the invention is illustrated and described herein as embodied in pneumatic spring element, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

The single figure of the drawing is a diagrammatic, longitudinal-sectional view of a spring element according to the invention, in the unstressed state.

Referring now to the drawing in detail, there is seen a spring element 1 having an outer housing which has a chamber formed therein and which is formed of a cylindrical, rubber-elastic peripheral wall 2 and two solid end walls 3 and 4, which are preferably made of plastic. In the illustrated embodiment, a stack of ten annular disk-shaped metal plates 5 is disposed coaxially with the cylindrical, rubber-elastic peripheral wall 2, in the interior of the spring element. The plates 5 have a diameter which is smaller than the inside diameter of the rubber-elastic peripheral wall 2. However, depending on the requirements, a different number of metal plates is also possible, although at least three plates must be provided. The metal plates 5 are alternatingly joined together in the vicinity of the inner periphery thereof by annular rubber elements 6 and in the vicinity of the outer periphery thereof by annular rubber elements 7, the rubber elements 6 and 7 being suitably vulcanized onto the metal plates 5. The metal plates 5 can thus be stretched apart or compressed in accordion or bellows-like fashion, with the rubber elements alternatingly vulcanized onto the inside and outside, assuming the function of joints.

The thickness of the annular disk-like metal plates 5 is advantageously from 0.1 to 1.0 mm, while the distance by which they are spaced apart from one another in the unstressed state amounts approximately to from 1 to 5 mm. The correspondingly thick rubber walls 2 are suitably manufactured from an electrically insulating elastomer material.

The metal plates 5 are alternately connected by a lead 8 extending through the upper end wall 3 to a non-illustrated voltage source of from 0 to 10 kV and by a lead 9 extending through the upper end wall 3 to ground potential. Electrical contact is made through an air-filled inner sub-chamber 12, because good accessibility exists there. The leads 8 and 9 may be made of electrically conductive natural rubber and may be vulcanized directly onto the metal plates 5, since the required currents, even at voltages of 10 kV, are so slight that the conductivity of soot or carbon-filled natural rubber mixtures is entirely adequate for carrying the required current.

Two mutually concentric sub-chambers 11 and 12 are partitioned off inside the rubber-elastic peripheral wall 2 by means of a spring body 10 formed by the metal plates 5 and the annular rubber elements 6 and 7. A valve 16 connects the sub-chamber 12 located inside the spring body 10 through the lower end wall 4 to an adjustable compressed air line 15, and as a result the inner sub-chamber 12 can be subjected to an adjustable pressure of from 0 to 10 bar.

The outer sub-chamber 11 between the spring body 10 and the peripheral wall 2 is filled with an electroviscous fluid, which may be introduced, for instance, through a closable opening 13 in the upper end wall 3. The electroviscous fluid may, for example, be formed of a mixture of approximately 40 to 60% by weight of silicic acid as a solid, 30 to 50% by weight of a suitable organic phase having a low electrical constant, 5 to 10 by weight of water, and approximately 5 by weight of a dispersing agent, and may have an intrinsic viscosity of from 100 to 3,000 mPa x s.

The mode of operation of a pneumatic spring element of this kind is as follows:

If force is exerted from above as indicated by an arrow 17, the stack of metal plates 5 is compressed, which compresses the air in the spring body 10. This generates a restoring force, which largely determines the stiffness of the pneumatic spring element. A slight contribution to the stiffness is also made by the elastic deformation of the metal plates 5 and by the rubber elements 6 and 7 acting as joints. Simultaneously with the compression of the metal plates 5, the spacing between them decreases and the electroviscous fluid located in the interstices is positively displaced toward the outside, causing an outward bulging of the peripheral wall 2. Upon relaxation, the fluid is positively displaced back into the interstices between the metal plates 5 by the ambient air pressure and by restoring forces of the peripheral wall 2 as well, given a correspondingly volumetrically rigid construction of the peripheral wall.

If high voltage or ground potential is alternately applied to the metal plates 5, causing the metal plates 5 to act as electrodes, the viscosity of the fluid located between the metal plates increases sharply and upon compression a notably higher deformation resistance is produced, which is substantially a function of speed and which is expressed in an increase of the damping constant of the spring element 1.

In a pneumatic spring element constructed according to the invention, a spring stiffness of 250 N/mm and a mechanical loss angle of 5 degrees have been produced at an air pressure inside the spring body 10 of 3 bar. This basic damping is effected by the viscosity of the fluid used and by the rubber elements 6 and 7 used as joints between the metal plates 5. By increasing the voltage from 0 to 4 kV in the range from 0 to 100 Hz, an increase of the mechanical loss angle to 20 degrees and hence a very substantial increase in the damping have been attained, without any significant change in the spring stiffness. By appropriate geometric adaptation of the various structural parts of the pneumatic spring element to one another and by optimizing the intrinsic viscosity of the fluid, these figures can be markedly increased even further.

Through the use of the above-described embodiment of the pneumatic spring element and by using an electroviscous fluid, it is thus possible in a simple manner to adjust the basic stiffness by means of the air pressure and additionally to attain damping and to control it within wide limits using an appropriate control voltage. The viscosity of the fluid used can be varied by a factor of from 3 to 1000 depending on its composition, its intrinsic viscosity and the mechanical construction of the pneumatic spring element, by applying an electrical field; the total power consumption of the element is generally less than 2 watts.

The foregoing is a description corresponding in substance to German Application No. P 35 40 300.4, dated Nov. 13, 1985, the International priority of which is being claimed for the instant application, and which is hereby made part of this application. Any material discrepancies between the foregoing specification and the aforementioned corresponding German application are to be resolved in favor of the latter.

I claim:

1. Pneumatic spring element, comprising a rubber-elastic peripheral wall and two rigid end walls defining a chamber therebetween, a bellows-like spring body disposed inside said chamber defining an outer sub-chamber between said spring body and said peripheral wall, said bellows-like spring body being formed of a stack of at least three anular disk-shaped metal plates having inner and outer peripheries, annular rubber elements alternately joining said metal plates together at said inner and outer peripheries thereof, said spring body being subjected to compressed air in the interior thereof, an electroviscous fluid filling said outer sub-chamber, and means for alternately connecting said metal plates to a voltage source and to ground potential for controlling said electroviscous fluid with an electrical field.

2. Pneumatic spring element according to claim 1, wherein said metal plates are spaced apart in an unstressed state by between 1 and 5 mm.

3. Pneumatic spring element according to claim 1, wherein said annular rubber elements mutually insulate as well as interconnect said metal plates and are formed of electrically insulating elastomer material.

4. Pneumatic spring element according to claim 1, wherein said spring body has an air-filled inner sub-chamber formed therein, and said connecting means include electrical connections for said metal plates extending inside said air-filled inner sub-chamber.

5. Pneumatic spring element according to claim 4, wherein said electrical connections are formed of electrically conductive natural rubber.

6. Pneumatic spring element according to claim 1, wherein said spring body has an inner sub-chamber formed therein, and one of said end plates has a compressed air valve disposed therein communicating with said inner sub-chamber.

* * * * *